Sept. 7, 1937.  O. G. RIESKE  2,092,262
FISH BONING MACHINE
Filed Nov. 7, 1935  3 Sheets-Sheet 1
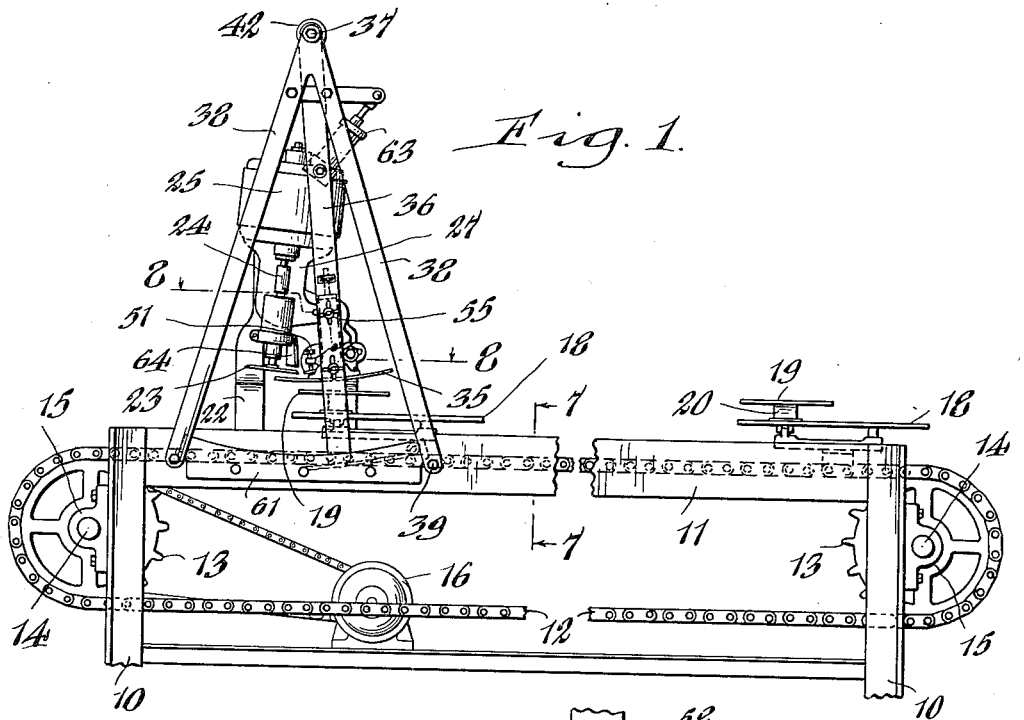
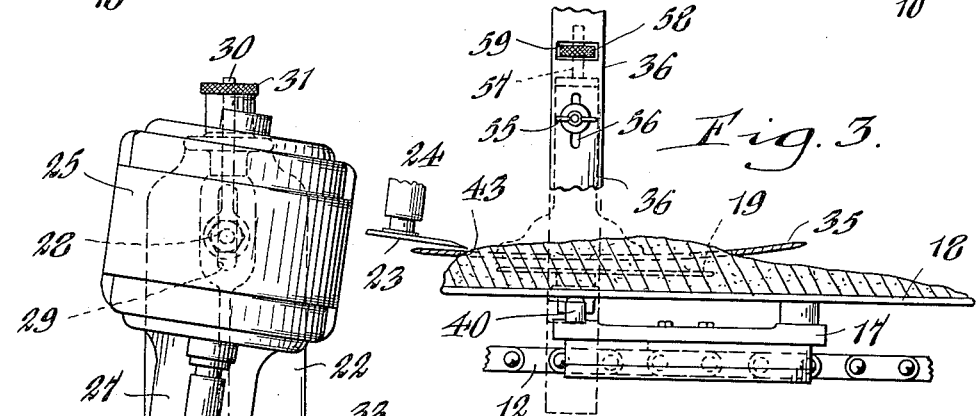
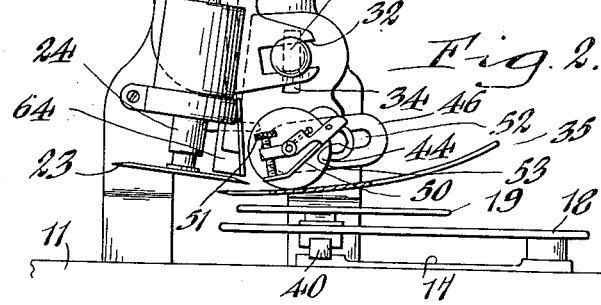
Inventor,
Otto G. Rieske,
by Walter P. Geyer
Attorney.

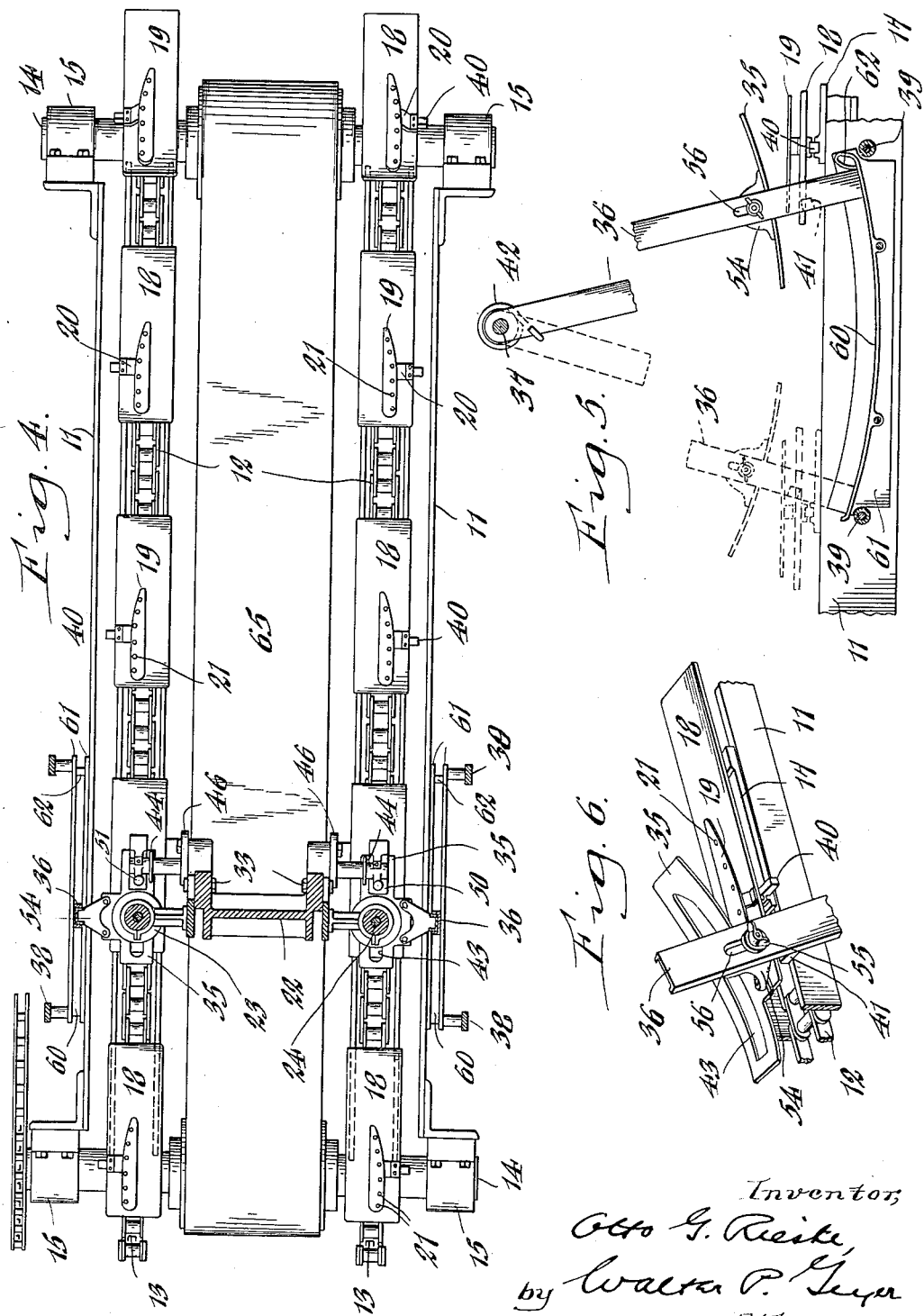

Sept. 7, 1937.  O. G. RIESKE  2,092,262

FISH BONING MACHINE

Filed Nov. 7, 1935  3 Sheets-Sheet 3

Inventor,
Otto G. Rieske,
by Walter P. Guyer
Attorney.

Patented Sept. 7, 1937

2,092,262

UNITED STATES PATENT OFFICE 2,092,262

FISH-BONING MACHINE

Otto G. Rieske, Buffalo, N. Y.

Application November 7, 1935, Serial No. 48,687

18 Claims. (Cl. 17—3)

This invention relates generally to a fish cutting apparatus but more particularly to a machine for severing the nape or rib bone from the body of the fish.

It has for one of its objects to provide an improved machine of this character which is so designed and constructed as to effect a smooth and clean severance of the nape bone or like portion from the fish with a minimum of waste.

Another object of the invention is to provide a boning machine having reliable and positive means for effectually holding or clamping the fish during the cutting of the bone therefrom.

Other features of the invention reside in the construction and arrangement of parts hereinafter described and particularly pointed out in the appended claims.

In the accompanying drawings:—

Figure 7:
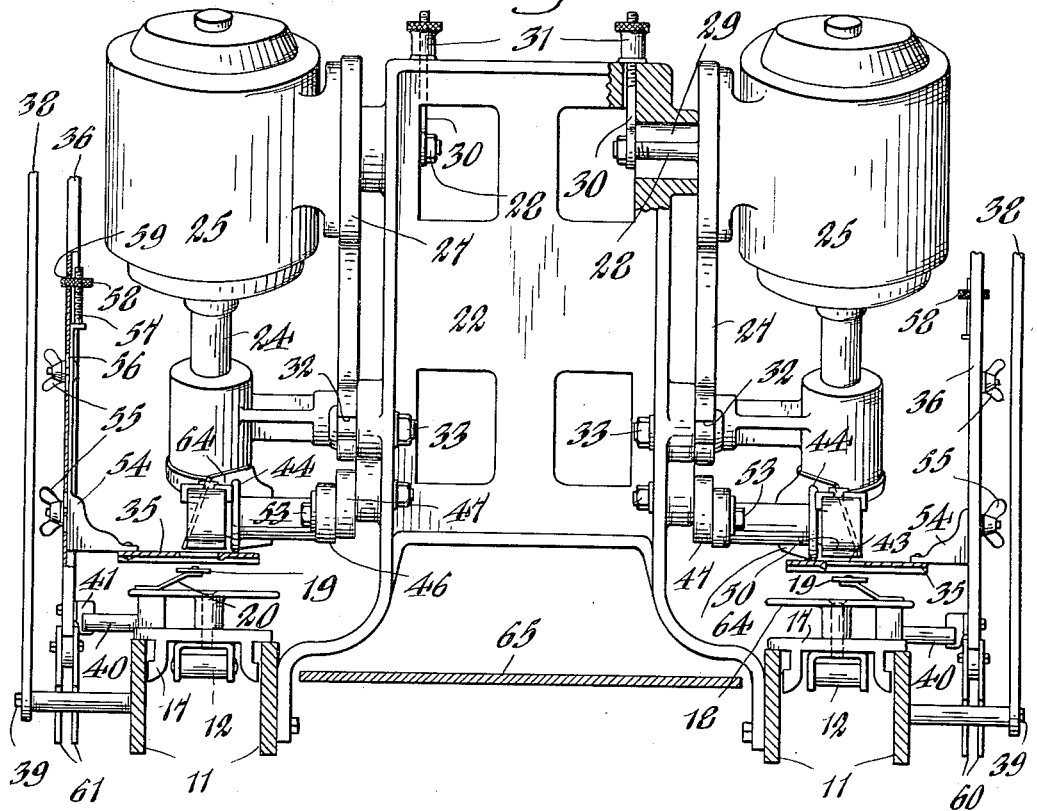
Figure 8:
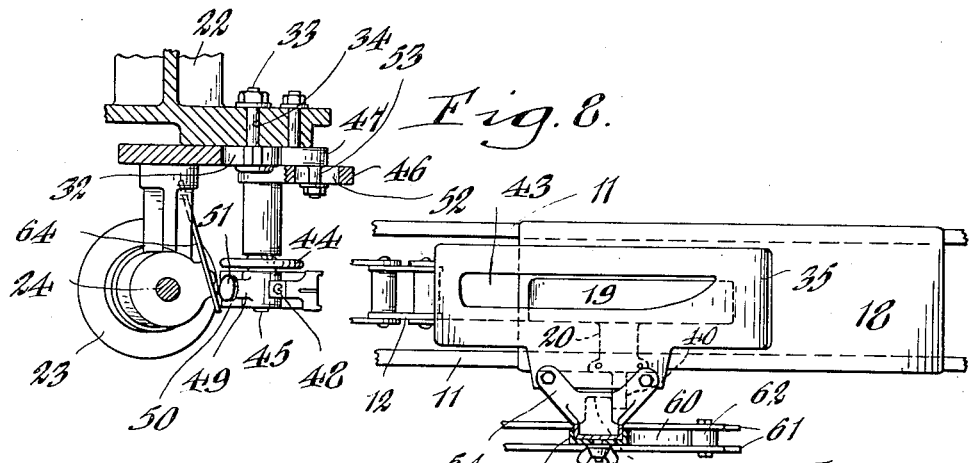

Figure 1 is a side elevation of my improved boning machine. Figure 2 is an enlarged fragmentary side elevation, partly in section, of the fish-holding and cutting mechanism, the parts being in position just prior to the cutting operation. Figure 3 is an enlarged sectional side view of the fish-holding means with the fish clamped therebetween. Figure 4 is a top plan view of the machine, partly in section. Figure 5 is a fragmentary front view of the clamping plate supporting arm and associated parts. Figure 6 is a fragmentary perspective view thereof. Figure 7 is an enlarged cross section taken substantially in the plane of line 7—7, Figure 1. Figure 8 is an enlarged fragmentary horizontal section taken substantially in the plane of line 8—8, Figure 1.

Similar characters of reference indicate corresponding parts throughout the several views.

The working parts of the machine may be supported on a suitable frame of any appropriate construction, that shown in the drawings including supporting legs 10 and spaced pairs of longitudinal beams or rails 11, as seen in Figures 1 and 6. Mounted on this frame are one or more conveyor mechanisms, two being shown in the drawings, arranged at opposite sides of the machine with their upper stretches passing between the companion rails 11, each of the conveyor mechanisms having carriers or holders for the fish applied thereto, which successively present the fish to a companion cutter blade or knife disposed in a path of travel of the carriers for severing the nape or rib bone from the fish as they travel past the cutter. Associated with each conveyor in addition to the cutter, is a mechanism actuated at predetermined points in the path of travel of the conveyor for cooperative engagement with the successive carriers to effectually hold and clamp the fish to the carrier during the cutting operation.

Each of the conveyors consists of an endless belt or chain 12 disposed lengthwise of the machine and passing at its ends around sprocket wheels 13 mounted on corresponding transverse horizontal shafts 14 journaled in suitable bearings 15 secured to the machine-frame. Both conveyors are driven in unison at a comparatively slow speed by an electric motor 16 or other source of power. Applied to each conveyor at suitable intervals thereon are a plurality of fish-holders or carriers which serve to support the fish and present it to the cutter for severing the nape bone. Each of these carriers consists of a chain-attaching member 17 upon which is mounted a base plate or table 18 upon which the fish is supported in the manner shown in Figure 3. On its top side this base plate is provided with a head or raised surface of the proper shape or contour to raise the nape bone portion of the fish above its body when the fish is placed on the carrier preparatory to being presented to the cutter, this raised surface being preferably in the form of a substantially narrow head-plate 19 yieldably supported in spaced relation to the base plate by a leaf spring 20, whereby the plate 19 is afforded some resilience in accommodating the fish to the carrier. If desired, this elevated plate or surface may be provided with a series of openings 21 to better serve to retain the fillet of fish in place on the carrier.

Disposed at the left hand end of the machine and preferably arranged in the space between the conveyors 12 and rising above the same, is a supporting standard 22 bolted or otherwise fastened at its lower end to the adjoining side rails 11 of the machine and upon which are mounted the cutters 23 and associated parts, the cutters being disposed over and in line with the companion conveyors. Each cutter, which is by preference in the form of a revolving disk, is applied to the lower end of a substantially upright shaft 24 driven directly by a companion electric motor 25 which is bolted or otherwise fastened to an adjustable upright bracket 27. This bracket is so mounted on the standard 22 as to permit its vertical and pivotal adjustment to bring the cutter into proper operative relation with the fish to be treated, that is, at the proper elevation and angle to the fish to effect the cut desired. To this end, this bracket is pivoted at its upper end to a pivot bolt 28 which is adjustably fitted in an upright slot 29 formed in the adjoining side wall of the standard 22, as shown in Figure 7. This bolt is in turn carried by a vertically-adjustable eye bolt 30 mounted in the top side of the standard and provided with an adjusting nut 31, whereby, upon turning this adjusting nut in one direction or the other, this bracket may be shifted upward or downward within a limited range. The lower end of this bracket has a laterally-opening notch 32 which engages a corresponding clamping bolt 33 fitted in a vertical slot 34 in the lower portion of the standard for holding the bracket in a set position of adjustment.

Means are provided for successive cooperation with the respective carriers and particularly for registering, overlying relation with the head-plate 19 of each carrier for the purpose of effectually holding and clamping the fish with its nape bone or other portion to be severed in exposed relation for presentation to the companion cutter 23 in the manner shown in Figure 3. To this end a clamping or presser plate 35 is provided which is applied adjacent the lower end of a pendant, vertically-swinging arm 36 fulcrumed at its upper end on a transverse shaft 37 supported at its ends in inverted, V-shaped frames 38 rising from the opposite sides of the machine and fastened at their lower ends by bolts 39 to the adjoining longitudinal machine-rails 11, as shown in Figures 1 and 7. This arm is adapted to rock in the direction of movement of the conveyor 12 and its carriers for the purpose of bringing its clamping or presser plate 35, at a predetermined time, into holding engagement with the fish for the period required for effecting the severance of the nape bone or other protruded portion from the fish, after which said arm is adapted to rock in the opposite direction and return to its initial position ready for cooperative relation with the next carrier. Applied to each carrier 18 adjacent the front end thereof is a laterally-projecting tappet 40 which is adapted to abut against a companion trip lug 41 applied to the lower end of the respective arm 36 and disposed in the path of movement of such tappet, whereby as the carrier approaches the pendant arm 36 its tappet encounters the trip lug 41 and causes the arm to move forwardly with the carrier while its presser or plate 35 is brought into overlying relation with the fish to effectually hold it in place on the carrier for presentation to the cutter 23. The stroke of the arm 36 is from the position shown by full lines in Figure 5 to that shown by dotted lines in the same figure. The arc of movement of the trip lug 41 is such that when the arm reaches the dotted line position, shown in Figure 5, such lug is released from the carrier tappet 40 and the arm is then free to rock rearwardly and return to its initial position. A coil spring 42 applied to the arm-supporting shaft 37 and bearing against the arm 36 constantly urges the latter to its normal retracted position shown by full lines in Figure 5.

As shown in Figures 3 and 8, the clamping or presser plate 35 has an opening 43 therein which, in the clamped position of the plate, registers with the head plate 19 of the carrier 18 to effect the protrusion of the nape bone portion of the fish through such opening, the carrier being thereupon presented to and passing the cutter 23 to sever such protruded portion from the body of a fish.

Cooperating with each presser or clamping plate 35 as it moves with the arm 36 during the cutting operation, is a backing member or guide which is preferably in the form of a wheel or roller 44 mounted on an arbor 45 carried by an adjustable bracket arm 46 secured to the standard 22 through the medium of a spacer member 47. This roller is disposed in the path of travel of the top surface of the clamping plate to exert a pressure thereon and hold it firmly against the fish. Also mounted on the arbor 45 and held thereon by a set screw 48 is a bracket 49 upon which is mounted a cutter gage bar 50 made preferably of spring steel and anchored at one end to the bracket-arm and having its free end adjustable relatively to the cutter 23 through the medium of an adjusting screw 51, as shown in Figure 2. By turning this screw in one direction or the other, the gage bar is flexed up or down relatively to the edge of the cutter to accordingly govern the cut. For the purpose of obtaining a coarser adjustment of the gage bar in accordance with a bodily vertical adjustment of the cutter 23, the arbor-carrying bracket 46 is provided with a slot 52 with which a fastening bolt or stud 53 carried by the spacer member 47 engages. Upon loosening this bolt the arm 46 may be adjusted toward and from the cutter 23 or it may be adjusted vertically relatively thereto, this adjustment also setting the roller 44, also borne by said arm, in proper relation to the clamping plate 35 for the thickness of cut desired.

The clamping plate 35 is likewise adjustable vertically of its supporting arm 36 to adapt it to different thicknesses of fish, and for this purpose it is applied to a bracket 54 slidably mounted on said arm and having clamping bolts 55 thereon engaging corresponding slots 56 in the arm, as shown in Figures 1 and 7. An adjusting screw 57 applied to the upper end of the bracket, and having a nut 58 thereon seated in a notch 59 in the arm 36, serves to permit the ready adjustment of the bracket where desired.

To prevent any objectionable noise or chattering of the arm 36 on its return stroke, I provide a flat spring 60 which is disposed between a pair of guide bars 61 for the lower end of the arm, and which terminates in a buffer or yieldable loop 62 forming a cushion stop for said arm. To retard the return movement of the arm, a dash pot 63 is provided.

Disposed immediately over the cutter 23 is a deflector 64 which is so disposed as to guide and direct the severed portion of the fish to one side as it is presented to the cutter. A conveyor 65 is disposed centrally of the machine to receive the severed portions of the fish and it may also be conveniently used to carry the fish fillets before being placed by the operator on the carriers 18.

I claim as my invention:—

1. A fish boning machine, comprising a traveling carrier for supporting a fish, means supported independently of and disposed over the path of travel of the carrier for cooperative engagement therewith at a predetermined point in such travel and adapted to overlie the fish with a portion protruding above the same, and means for severing the protruded portion of the fish from its body.

2. A fish boning machine, comprising a traveling carrier for supporting a fish, means supported independently of and disposed over the path of travel of the carrier for cooperative engagement therewith at a predetermined point in such travel and adapted to overlie the fish with a portion protruding above the same, said carrier having a projection on its top side and said overlying means having an opening therein for registration with said projection and whereby that portion of the fish to be severed is protruded through said opening, and means for severing the protruding portion of the fish from its body.

3. A fish boning machine, comprising a traveling carrier for supporting a fish; means supported independently of and disposed over the path of travel of the carrier for movement into and out of cooperative engagement therewith to clamp the fish to said carrier with a portion protruding above the same, means for actuating said clamping means into and out of clamped position at a predetermined point in the movement of the carrier, and means for severing the protruded portion of the fish from its body.

4. A fish boning machine, comprising a cutter, a conveyor having a carrier for a fish mounted thereon and movable past the cutter, a member companion to said carrier disposed above the path of the conveyor and in advance of said cutter, said member being movable into overlying relation to the carrier to clamp the fish thereto and having an opening therein through which that part of the fish to be severed is adapted to protrude, and means for supporting said companion member for movement into and out of overlying relation to the carrier at a predetermined point in its travel.

5. A fish boning machine, comprising a cutter, a conveyor having a plurality of fish carriers thereon and movable successively past the cutter, and a member disposed in advance of said cutter and mounted for movement at predetermined points in the travel of the conveyor into and out of overlying relation with the successive carriers, respectively, for holding the fish on the carriers when passing said cutter.

6. A fish boning machine, comprising a cutter, a conveyor having a plurality of fish carriers thereon and movable successively past the cutter, and a member disposed in advance of said cutter and mounted for movement at predetermined points in the travel of the conveyor into and out of overlying relation with the successive carriers, respectively, for holding the fish on the carriers when passing said cutter, each of said carriers having an elevated surface thereon and said overlying holding member having a companion opening therein through which that portion of the fish to be severed is adapted to protrude.

7. A fish boning machine, comprising a traveling carrier for supporting a fish, a member disposed over the path of travel of the carrier for cooperative engagement therewith to temporarily clamp the fish thereto at a predetermined point in the travel of the carrier, a cutter for engagement with the fish while clamped to sever a desired portion therefrom, and means for supporting said clamping member for simultaneous movement and in cooperative relation with the carrier over a predetermined path of its travel.

8. A fish boning machine, comprising a traveling carrier for supporting a fish, a member disposed over the path of travel of the carrier for cooperative engagement therewith to temporarily clamp the fish thereto at a predetermined point in the travel of the carrier, a cutter for engagement with the fish while clamped to sever a desired portion therefrom, a suspension element for said clamping member mounted for movement in the direction of the carrier during its clamped position, and means for actuating said element.

9. A fish boning machine, comprising a traveling carrier for supporting a fish, a member disposed over the path of travel of the carrier for cooperative engagement therewith to temporarily clamp the fish thereto at a predetermined point in the travel of the carrier, a cutter for engagement with the fish while clamped to sever a desired portion therefrom, a suspension element for said clamping member mounted for movement in the direction of the carrier during its clamped position, and means for releasably clutching said suspension element with the carrier to actuate it in a direction to bring said clamping member into fish-holding position.

10. A fish boning machine, comprising a traveling carrier for supporting a fish, a member disposed over the path of travel of the carrier for cooperative engagement therewith to temporarily clamp the fish thereto at a predetermined point in the travel of the carrier, a cutter for engagement with the fish while clamped to sever a desired portion therefrom, a suspension element for said clamping member mounted for movement in the direction of the carrier during its clamped position, means for actuating said element simultaneously with the carrier, and means for returning said element and its clamping member to initial position after the cutting operation is performed.

11. A fish boning machine, comprising a traveling carrier for supporting a fish, a member disposed over the path of travel of the carrier for cooperative engagement therewith to temporarily clamp the fish thereto at a predetermined point in the travel of the carrier, a cutter for engagement with the fish while clamped to sever a desired portion therefrom, a suspension element for said clamping member mounted for movement in the direction of the carrier during its clamped position, means for releasably clutching said suspension element with the carrier to actuate it in a direction to bring said clamping member into fish-holding position, and clutching means being released after the cutting operation is performed, and means for returning said suspension element to its initial position upon the release of said clutching means.

12. A fish boning machine, comprising a cutter, a conveyor having a carrier for a fish mounted thereon and movable past the cutter, a member companion to said carrier disposed above the path of the conveyor and in advance of said cutter, said member being movable into overlying relation to the carrier to clamp the fish thereto and having an opening therein through which that part of the fish to be severed is adapted to protrude, means for supporting said companion member for movement into and out of overlying relation to the carrier at a predetermined point in its travel, and means movable with the conveyor and in the path of said supporting means for actuating the same to bring said clamping member into fish-holding position.

13. A fish boning machine, comprising a cutter, a conveyor having a carrier for a fish mounted thereon and movable past the cutter, a member companion to said carrier disposed above the path of the conveyor and in advance of said cutter, said member being movable into overlying relation to the carrier to clamp the fish thereto and having an opening therein through which that part of the fish to be severed is adapted to protrude, means for supporting said companion member for movement into and out of overlying relation to the carrier at a predetermined point in its travel, means movable with the conveyor and in the path of said supporting means for actuating the same to bring said clamping member into fish-holding position, and means acting on said supporting means for constantly urging it in a direction counter to the conveyor-travel and to a predetermined initial position.

14. A fish boning machine, comprising a cutter, a conveyor having a carrier for a fish mounted thereon and movable past the cutter, a member companion to said carrier disposed above the path of the conveyor and in advance of said cutter, said member being movable into overlying relation to the carrier to clamp the fish thereto and having an opening therein through which that part of the fish to be severed is adapted to protrude, means for supporting said companion member for movement into and out of overlying relation to the carrier at a predetermined point in its travel, means acting on said supporting means for constantly urging it in a direction counter to the conveyor travel and to a predetermined initial position, and means for arresting the movement of said supporting means at such position.

15. A fish boning machine, comprising a traveling carrier for supporting a fish, means disposed over the path of travel of the carrier for cooperative engagement therewith at a predetermined point in such travel and adapted to overlie the fish with a portion protruding above the same, a cutter for severing the protruded portion of the fish from its body, and a gage bar in cooperative relation with said cutter and including adjustable means therefor for gaging the depth of cut.

16. A fish boning machine, comprising a traveling carrier for supporting a fish, means disposed over the path of travel of the carrier for cooperative engagement therewith at a predetermined point in such travel and adapted to overlie the fish with a portion protruding above the same, means for severing the protruded portion of the fish from its body, and a deflector disposed over said severing means for directing the severed portion of the fish to one side.

17. A fish holder of the character described, comprising a base plate, a head-plate of smaller dimensions than said base plate disposed over the same in spaced relation thereto and of a contour to raise the nape bone portion of the fish above its body, and a yieldable support for said head-plate.

18. A fish boning machine, comprising a cutter, a traveling carrier for supporting a fish movable past the cutter, a vertically-swinging support having a member applied thereto for cooperative relation with the carrier for clamping a fish thereto while passing the cutter, said member having an opening therein through which a portion of the fish is adapted to protrude for exposing it to the cutter, a backing guide for the top side of said clamping member, adjustable means in cooperative engagement with the cutter for gaging the thickness of cut, a deflector for directing the severed portion of the fish to one side of the carrier, means acting on said vertically-swinging support for constantly urging it to an inactive position in advance of the cutter, said support having a trip lug thereon, and a tappet applied to said carrier for engaging said trip lug for shifting the support simultaneously with the carrier to bring its clamping member into fish-holding position as the carrier passes the cutter, said trip lug being released from the carrier tappet at the end of the cutting stroke of said support.

OTTO G. RIESKE.